Oct. 22, 1963

W. R. BARRETT ETAL 3,108,173

INFRA-RED HEATING APPARATUS

Filed July 22, 1960

Walter Raymond Barrett
Kenneth D. Harris,
Inventors.
Koenig and Pope,
Attorneys

Oct. 22, 1963 W. R. BARRETT ETAL 3,108,173
INFRA-RED HEATING APPARATUS
Filed July 22, 1960 4 Sheets-Sheet 2

Walter Raymond Barrett
Kenneth D. Harris,
Inventors.
Koenig and Pope,
Attorneys.

3,108,173
INFRA-RED HEATING APPARATUS
Walter Raymond Barrett, Clayton, and Kenneth D. Harris, Crestwood, Mo., assignors to Lakeshire Products, Inc., Brentwood, Mo., a corporation of Missouri
Filed July 22, 1960, Ser. No. 44,648
5 Claims. (Cl. 219—35)

This invention relates to heating apparatus, and more particularly to infra-red heating apparatus for heating or broiling sandwiches and other food items.

Among the several objects of the invention may be noted the provision of infra-red heating apparatus of the class described which is of such construction as to provide for more uniform radiation of heat to a grill of the apparatus upon which items are placed for heating or broiling, so that a plurality of items on the grill may be substantially uniformly heated; the provision of apparatus of this class which provides for substantially uniform radiation of heat to both the bottom and the top of food items placed on the grill; the provision of apparatus of this class which is so constructed as to provide four heating chambers, two of which may be utilized when a few items are to be heated and all of which may be utilized when more items are to be heated; and the provision of such apparatus which is of economical construction and reliable in operation. Other objects and features will be in part apparent and in part pointed out hereinafter.

The invention accordingly comprises the constructions hereinafter described, the scope of the invention being indicated in the following claims.

In the accompanying drawings, in which one of various possible embodiments of the invention is illustrated, FIG. 1 is a front elevation of heating apparatus of the invention;

Corresponding reference characters indicate corresponding parts throughout the several views of the drawings.

Figure 1:
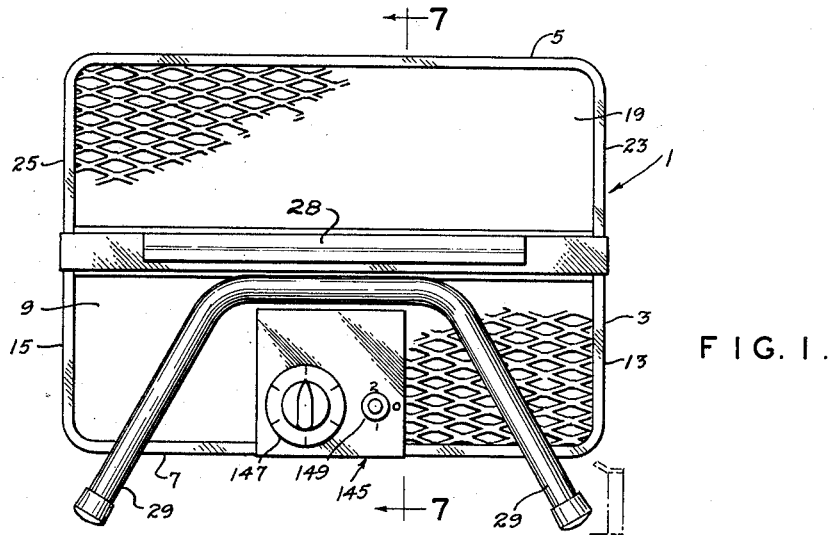
Figure 2:
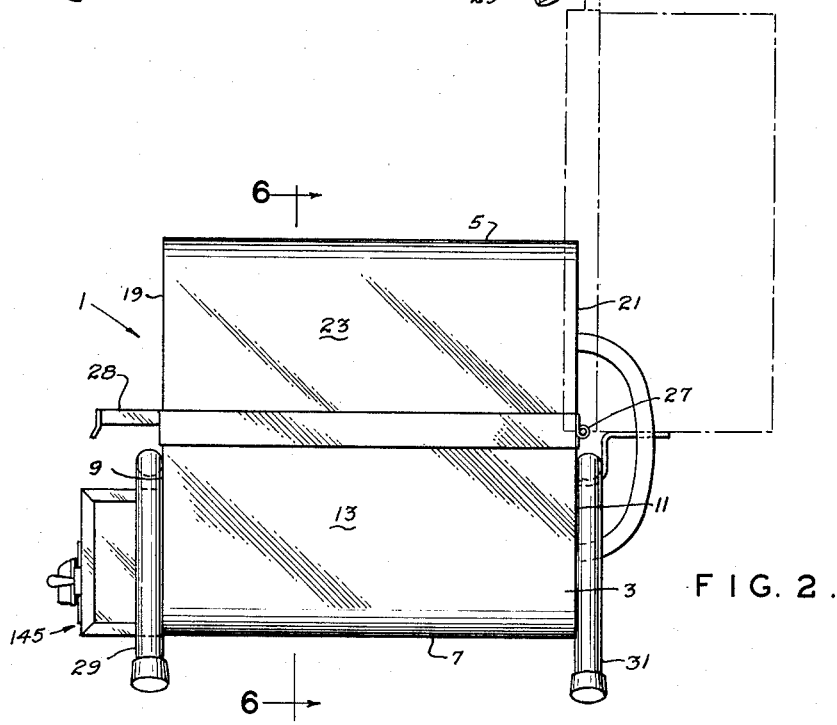
FIG. 2 is a right side elevation of the heating apparatus of FIG. 1 with an upper housing thereof being shown in an open or raised position in dotted lines.
Figure 3:
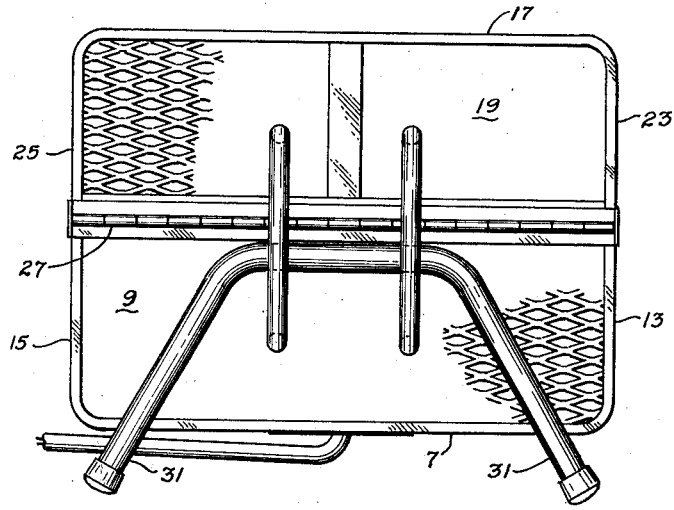
FIG. 3 is a rear elevation of the heating apparatus of FIG. 1.
Figure 4:
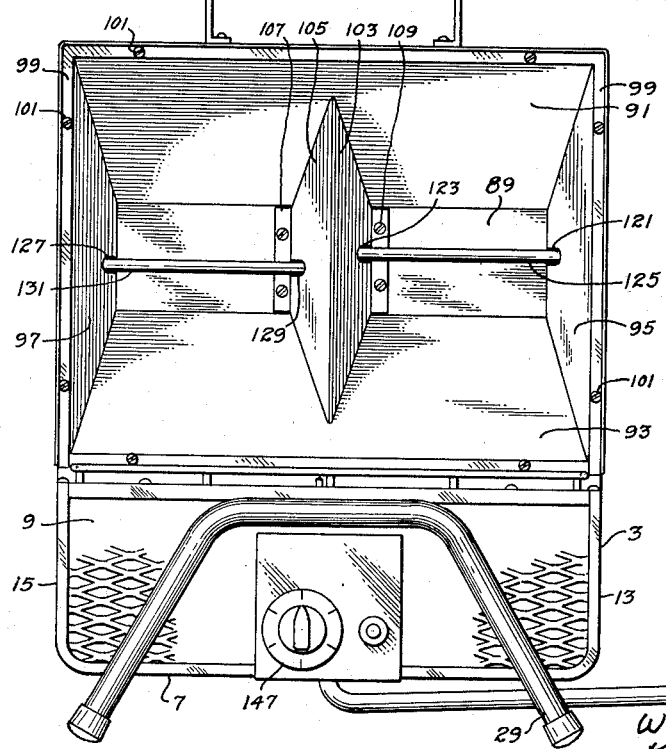
FIG. 4 is a front elevation of the heating apparatus of FIG. 1 with the upper housing in open position.
Figure 5:
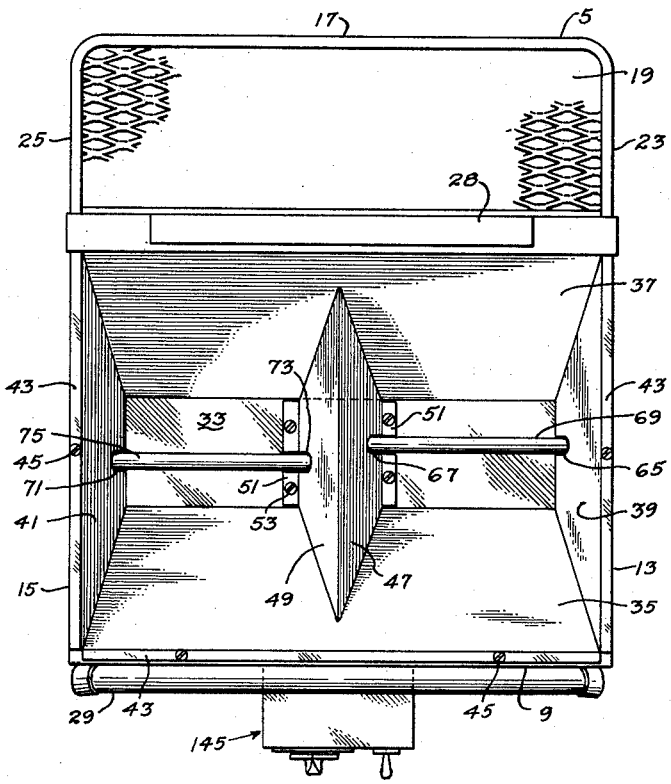
FIG. 5 is a top plan view of the heating apparatus of FIG. 1 with the upper housing in open position.

Referring to the drawings, heating apparatus of the invention generally designated 1 is shown to comprise a lower housing 3 and an upper housing 5 formed of any suitable metal. The lower housing 3 has a bottom wall 7, a front wall 9, a rear wall 11 and side walls 13 and 15. The upper housing 5 has a top wall 17, a front wall 19, a rear wall 21 and side walls 23 and 25. The front and rear walls of both housings may each comprise a perforate panel, of expanded sheet metal, for example. The lower edge of the rear wall 21 of the upper housing 5 is hinged as indicated at 27 to the upper edge of the rear wall 11 of the lower housing 3 so that the upper housing 5 is swingable from a closed position (shown in FIGS. 1–3) on top of the lower housing 3 to an open position (shown in FIGS. 4 and 5) above and to the rear of the lower housing 3. A handle 28 for raising and lowering the upper housing 5 is secured to the front wall 19 of the upper housing. A length of tubing bent to inverted U-shape is secured to the front wall 9 of the lower housing 3 to provide a pair of front supporting legs 29 and a similar bent length of tubing is secured to the rear wall 11 of the lower housing 3 to provide a pair of rear supporting legs 31.

In the lower housing 3 are a bottom radiant heat reflecting panel 33, a front radiant heat reflecting panel 35, a rear radiant heat reflecting panel 37 and side radiant heat reflecting panels 39 and 41. Each of these radiant heat reflecting panels is formed of a metal such as aluminum processed so as to have a reflecting surface thereon. The bottom, front and rear radiant heat reflecting panels 33, 35 and 37 are constituted by a single piece of reflecting metal bent to trough shape. The front radiant heat reflecting panel 35, rear radiant heat reflecting panel 37 and side radiant heat reflecting panels 39 and 41 each have an outwardly extending horizontal flange 43 at the upper edge thereof which engages the upper edge of the front wall 9, rear wall 11 and side walls 13 and 15, respectively, of the lower housing 3 and which is secured thereto by screws 45.

At 47 and 49 are indicated a pair of central radiant heat reflecting panels extending from the front heat reflecting panel 35 to the rear heat reflecting panel 37. As shown, these central heat reflecting panels 47 and 49 are constituted by a single piece of reflecting metal bent to V-shape. Each of central heat reflecting panels 47 and 49 has an outwardly extending horizontal flange 51 at its lower edge. Screws 53 secure flanges 51 to the bottom heat reflecting panel 33. Central heat reflecting panels 47 and 49 divide the space bounded by the bottom, front, rear and side reflecting panels 33, 35, 37, 39 and 41, respectively, into first and second chambers designated 55 and 57, respectively.

As shown, the front, rear, side and central heat reflecting panels 35, 37, 39, 41, 47 and 49, respectively, are inclined so as to diverge from the bottom to the top of the lower housing 3. Thus, the front and rear panels 35 and 37 are inclined at an angle of approximately 40°, the side panels 39 and 41 are inclined at an angle of approximately 15° and the central panels 47 and 49 are inclined at an angle of approximately 15°. It will be understood that these angles of inclination may be varied somewhat.

Figure 6:
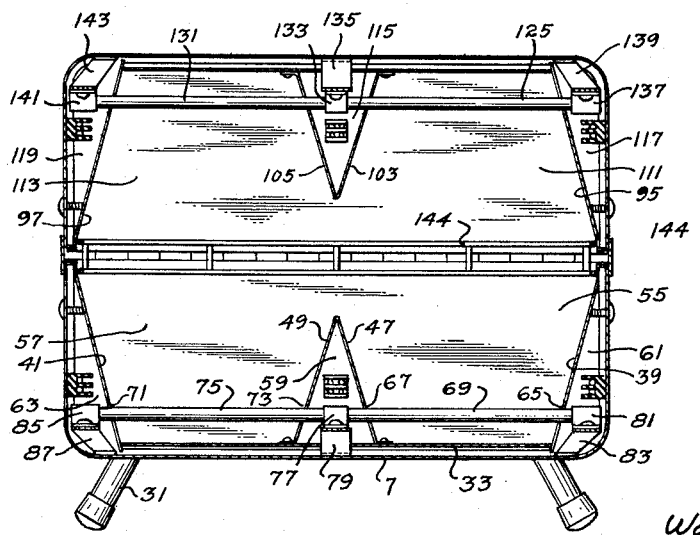
FIG. 6 is a vertical section taken on line 6—6 of FIG. 2.
Figure 7:
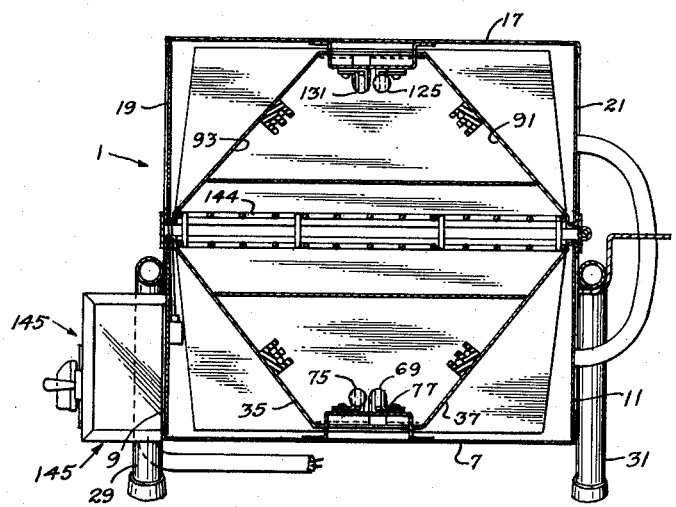
FIG. 7 is a vertical section taken on line 7—7 of FIG. 1.

By reason of their divergence, central panels 47 and 49 have a space 59 therebetween, side reflecting panel 39 and side wall 13 have a space 61 therebetween and side reflecting panel 41 and side wall 15 have a space 63 therebetween (see FIG. 6). Extending from the space 61 through an opening 65 in side reflecting panel 39 to the space 59 through an opening 67 in central reflecting panel 47 is a first elongate infra-red heating element 69, and extending from the space 63 through an opening 71 in side reflecting panel 41 to the space 59 through an opening 73 in central heating reflecting panel 49 is a second elongate infra-red heating element 75. These infra-red heating elements 69 and 75 are conventional quartz tubes. As appears in FIG. 5, heating elements 69 and 75 are offset somewhat from each other.

The inner ends of heating elements 69 and 75 in the space 59 are mounted in clips 77 extending through an opening in bottom panel 33. Clips 77 are secured to a bracket 79 on the bottom wall 7 of the lower housing 3. The outer end of element 69 in space 61 is mounted in a clip 81 secured to a bracket 83 on the bottom wall 7 of the lower housing 3 and the outer end of element 75 in the space 63 is mounted in a clip 85 secured to a bracket 87 on the bottom wall of the lower housing 3.

In the upper housing 5 are a top radiant heat reflecting panel 89, a front radiant heat reflecting panel 91, a rear radiant heat reflecting panel 93 and side radiant heat reflecting panels 95 and 97. As shown, the top, front and rear radiant heat reflecting panels 89, 91 and 93 are constituted by a single piece of reflecting metal bent to trough shape. The front panel 91, rear panel 93 and side panels 95 and 97 each have an outwardly extending horizontal flange 99 at the lower edge thereof which engages the lower edge of the front wall 19, rear wall 21 and side walls 23 and 25, respectively, of the upper housing 5 and which is secured thereto by screws 101.

At 103 and 105 are indicated a pair of central radiant heat reflecting panels extending from the front panel 91 to the rear panel 93. As shown, these central panels 103 and 105 are constituted by a single piece of reflecting metal bent to V-shape. Each of central heat reflecting panels 103 and 105 has an outwardly extending horizontal flange 107 at its upper edge. Screws 109 secure flanges 107 to the top heat reflecting panel 89. Central heat reflecting panels 103 and 105 thus divide the space bounded by the top, front, rear and side reflecting panels 89, 91, 93, 95 and 97, respectively, into third and fourth chambers designated 111 and 113, respectively.

As shown, the front, rear, side and central heat reflecting panels 91, 93 95, 97, 103 and 105, respectively, are inclined so as to diverge from the top to the bottom of the upper housing 5. The front and rear panels 91 and 93 are inclined at an angle of approximately 40°, the side panels 95 and 97 are inclined at an angle of approximately 15° and the central panels 103 and 105 are inclined at an angle of approximately 15°, but these angles of inclination may be varied somewhat.

By reason of their inclination, central panels 103 and 105 have a space 115 therebetween, side reflecting panel 95 and side wall 23 of the upper housing 5 having space 117 therebetween and side reflecting panel 97 and side wall 25 of the upper housing 5 have a space 119 therebetween. Extending from the space 117 through an opening 121 in side reflecting panel 95 to the space 115 through an opening 123 in central heating reflecting panel 103 is a third elongate infra-red heating element 125, and extending from the space 119 through an opening 127 in side reflecting panel 97 to the space 115 through an opening 129 in central reflecting panel 105 is a fourth elongate infra-red heating element 131. Heating elements 125 and 131 are conventional quartz tubes and as shown, are offset slightly from each other.

The inner ends of heating elements 125 and 131 in the space 115 are mounted in clips 133 extending through an opening in top panel 89. Clips 133 are secured to a bracket 135 on the top wall 17 of the upper housing 5. The outer end of heating element 125 in space 117 is mounted in a clip 137 secured to a bracket 139 on the top wall 17 of the upper housing 5 and the outer end of heating element 131 in the space 119 is mounted in a clip 141 secured to a bracket 143 of the top wall 17 of the upper housing 5.

A removable grill 144 is provided on top of the lower housing 3. As shown, the grill rests on the upper inclined surfaces of front heat reflecting panel 35, rear heat reflecting panel 37 and side heat reflecting panels 39 and 41.

A conventional electrical control unit generally designated 145, including a timer 147 and a switch 149, is provided on front wall 9 on the lower housing 3. Suitable electrical connections are provided between the heating elements 69, 75, 125 and 131 and control unit 145. Switch 149 is a conventional three-way switch, having an "off" position and two "on" positions. In one "on" position, the first and third heating elements 69 and 125 are energized to provide heat above and below the grill 144 in first and third chambers 55 and 111. In the other "on" position all four heating elements 69, 75, 125 and 131 are energized to provide heat above and below the grill 144 in the four chambers 55, 57, 111 and 113.

In use, upper housing 5 is opened, food items are placed on the grill, and the upper housing is then closed. Timer 147 is then turned to the desired setting and switch 149 is moved to one or the other of its "on" positions are desired to energize heating elements 69 and 125 or all four heating elements 69, 75, 125 and 131 as described to provide heat above and below the food items on the grill 144. After being heated for the desired time (as indicated by the timer), the switch 149 is moved to its "off" position and the upper housing 5 is opened to remove the heated food items from the grill. By reason of the divergence and disposition of the various radiant heat reflecting panels, the apparatus of the invention provides more uniform radiation of heat to the grill 144 thereby resulting in more uniform heating of items on the grill 144.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

We claim:

1. Heating apparatus for sandwiches and other food items comprising a lower housing having a bottom and front, rear and side walls, an upper housing having a top and front, rear and side walls, the lower edge of the rear wall of the upper housing being hinged to the upper edge of the rear wall of the lower housing so that the upper housing is swingable from a closed position on top of the lower housing to an open position, said lower housing having radiant heat reflecting panels therein at the bottom, front, rear and sides thereof, and central radiant heat reflecting panels extending from the front to the rear reflecting panel dividing the space bounded by the bottom, front, rear and side reflecting panels into first and second chambers, the front, rear, side and central panels being inclined so as to diverge from the bottom to the top of the lower housing, the central panels thereby having a space therebetween, and the side reflecting panels and the side walls thereby having spaces therebetween, a first elongate infra-red heating element extending from the space between one side wall and the respective side reflecting panel across the bottom of the first chamber into the space between the central panels, a second elongate infra-red heating element extending from the space between the other side wall and the respective side reflecting panel across the bottom of the second chamber into the space between the central panels, said upper housing having radiant heat reflecting panels therein at the top, front, rear and sides thereof, and central radiant heat reflecting panels extending from the front to the rear reflecting panel of the upper housing dividing the space bounded by the top, front, rear and side reflecting panels into third and fourth chambers, the front, rear, side and central panels in the upper housing being inclined so as to diverge from the top to the bottom of the upper housing, the central panels of the upper housing thereby having a space therebetween and the side reflecting panels and the side walls of the upper housing thereby having spaces therebetween, a third elongate infra-red heating element extending from the space between one side wall of the upper housing and the respective side reflecting panel across the top of the third chamber into the space between the central panels of the upper housing, a fourth elongate infra-red heating element extending from the space between the other side wall of the upper housing and the respective side reflecting panel across the top of the fourth chamber and into the space between hte central panels of the upper housing, and a grill at the top of the lower housing.

2. Heating apparatus as set forth in claim 1 wherein said central reflecting panels are constituted by a single piece of reflecting metal bent to V-shape.

3. Heating apparatus as set forth in claim 2 wherein the front, bottom and rear panels are constituted by a single piece of reflecting metal bent to trough shape.

4. Heating apparatus as set forth in claim 3 wherein the ends of said first and second heating elements in the space between said central panels of the lower housing are mounted in clips which extend through an opening in the bottom panel and the ends of said third and fourth heating elements in the space between said central panels of the upper housing are mounted in clips which extend through an opening in the top panel.

5. Heating apparatus as set forth in claim 4 wherein the end of each of said first and second heating elements in the space between one side wall and the respective side reflecting panel of the lower housing is mounted in a clip secured to a bracket on said bottom wall of the lower housing and the end of each of said third and fourth heating elements in the space between said one wall and the respective reflecting panel of the upper housing is mounted in a clip secured to a bracket on said top wall of the upper housing.

References Cited in the file of this patent

UNITED STATES PATENTS

| | | |
|---|---|---|
| 1,790,083 | Armstrong | Jan. 27, 1931 |
| 2,764,664 | Stewart | Sept. 25, 1956 |
| 2,927,523 | Pritz | Mar. 8, 1960 |
| 2,957,973 | Torrez | Oct. 25, 1960 |